United States Patent
Meiller

[11] 3,898,255
[45] Aug. 5, 1975

[54] ORGANOSILICON COMPOUNDS
[75] Inventor: Francois Meiller, Palaiseau, France
[73] Assignee: Rhone-Progil, Courbevoie, France
[22] Filed: Apr. 15, 1974
[21] Appl. No.: 460,826

[30] Foreign Application Priority Data
Apr. 17, 1973 France............................ 73.13881

[52] U.S. Cl.... 260/448.2 N; 106/287 SB; 260/46.5 E; 260/448.2 E; 260/448.8 R
[51] Int. Cl............................. C07f 7/10; C07f 7/18
[58] Field of Search 260/448.8 R, 448.2 E, 448.2 N, 260/46.5 E

[56] References Cited
UNITED STATES PATENTS

| | | | |
|---|---|---|---|
| 2,823,218 | 2/1958 | Speier et al. | 260/448.2 E |
| 2,970,150 | 1/1961 | Bailey | 260/448.8 R |
| 3,020,302 | 2/1962 | Bailey et al. | 260/448.2 N |
| 3,375,218 | 3/1968 | Bailey et al. | 260/448.2 N X |
| 3,678,089 | 7/1972 | Berger | 260/448.8 R X |

OTHER PUBLICATIONS
Noll, "Chemistry and Technology of Silicones," 2nd Ed., Academic Press, N.Y. (1968), p. 81.

Primary Examiner—Paul F. Shaver

[57] ABSTRACT

Organosilicon compounds of the formula

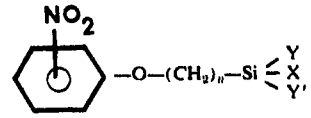

where X is a hydrolyzable group and Y and Y' are each a hydrolyzable group or a hydrocarbon, prepared by reaction of a silane

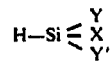

with an alkenyl ether of a nitrophenol.

4 Claims, No Drawings

ORGANOSILICON COMPOUNDS

The invention relates to silicon compounds derived from nitrophenols, and to a method of preparing these compounds and their use in the manufacture of polymers are copolymers.

Silicon compounds derived from nitrophenols are relatively unknown since the conventional nitration processes used in their preparation produce mixtures of isomers which are difficult to separate.

It is an object of this invention to provide pure silicon compounds derived from the nitrophenols.

According to the invention, the silicon compounds derived from nitrophenols are represented by the general formula:

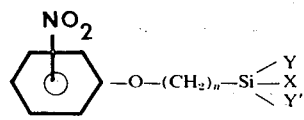

wherein
$n$ is a whole number from 2 to 4,
X represents a chlorine atom or a straight or branched alkoxy group with 1 to 8 carbon atoms, and
Y and Y', which may be similar or different, represent a chlorine atom, a methyl, ethyl or phenyl group or a straight or branched alkoxy group with 1 to 8 carbon atoms.

The compounds according to the invention, derived from nitrophenols, are in the form of liquids or solids, most of which can be distilled.

The method of preparing the silicon compounds derived from nitrophenols is to react a silane of the formula:

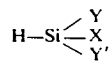

wherein X, Y and Y' have the same meaning as above, with an alkenyl ether of ortho, meta or para-nitrophenol, in the presence of a chloroplatinic or peroxide catalyst at a temperature of from 50° to 120°C.

Silanes which may be reacted include methyldichlorosilane, dimethylchlorosilane, trichlorosilane, methylphenylchlorosilane, methyldimethoxysilane, dimethylmethoxysilane, trimethoxysilane, diethylchlorosilane, dimethylethoxysilane, phenyldiethoxysilane, dimethyl-ethylbutoxysilane and dimethylethylhexoxysilane.

The alkylene ethers of nitrophenol which can be used are represented by the allyl, vinyl and γ-butenyl ethers of ortho, meta and para-nitrophenols.

The silane is used in stoichiometric proportions relative to the ether and preferably slightly in excess, up to 10% by weight.

The catalyst required for carrying out the process of the invention is represented either by chloroplatinic acid or alternatively an alkali metal chloroplatinate, or by an organic peroxide such as diacetyl peroxide, benzoyl peroxide or tertiobutyl perbenzoate. The quantities of catalyst used are of the order of 1 to 10 and preferably 2 to 5 ppm by weight of platinum relative to the ether for the chloroplatinic derivatives and 0.1 to 0.5% by weight relative to the ether for the peroxides.

It is preferable to operate at atmospheric pressure, although one can operate at autogenous pressure depending on the reactivity of the materials. The reaction takes 1 to 8 hours and the reaction temperature is from 50° to 120°C. As the reaction is generally exothermic, it is often necessary to cool the reaction mixture or to introduce one of the materials involved in the reaction continuously or in successive portions, in order to maintain that temperature.

The silicon compound thus formed, derived from nitrophenol, is then separated; the materials which have not reacted and any light materials which have formed during the reaction are eliminated and the silicon compound is distilled or crystallized. The yield is generally over 80% by weight.

In a modification of the method of the invention, silicon compounds derived from nitrophenols where the silicon atom carries 1 to 3 alkoxy groups may be prepared from silicon compounds derived from the corresponding nitrophenols where the silicon atom carries 1 to 3 chlorine atoms. These are reacted with a straight or branched alcohol with 1 to 8 carbon atoms, the alcohol being slightly in excess of the stoichiometric quantity, possibly up to 10% by weight. The reaction is carried out in the presence of an HCl acceptor such as pyridine, diethylaniline or diethylamine in stoichiometric proportions relative to the quantity of chlorine atoms in the silicon compound.

In order to facilitate the reaction, it is necessary for the reaction medium to be sufficiently fluid. Hence a diluent is added, which can dissolve the materials being reacted and the compound to be obtained but will not dissolve the amine hydrochloride formed. Examples are benzene, toluene, heptane and octane.

Since the reaction is extremely exothermic, the reaction medium is kept below 10°C, and the alcohol is added to it continuously or in successive portions; when all the alcohol has been added, the medium is brought to a boil.

When the medium has cooled, the hydrochloride formed is separated by filtration and the silicon compound is obtained after distillation of the solvent and distillation or crystallization of the product.

The silicon compounds according to the invention, derived from nitrophenols, can be used as intermediate products in synthesizing, particularly in color chemistry or in the preparation of polymers and copolymers by hydrolyzing the said compounds. The copolymers are obtained by copolymerizing a compound according to the invention with another of these compounds or with a conventional difunctional silane, possibly in the presence of a conventional chain limiter or of a monofunctional compound according to the invention, and can be used as protective coatings.

Having described the basic concepts of the invention, reference is now made to the following examples which are provided by way of illustration, and not of limitation, of the practice of the invention.

EXAMPLE 1

179 g of allyl ether of para-nitrophenol and
5 ppm of chloroplatinic acid
are placed in a flask equipped with an agitator. The reaction mixture is brought to 90°C; then 100 g of dimethylchlorosilane is added dropwise. When this has been done, the temperature is maintained at 110°C for 2 hours and then the product is distilled. 250 g (a yield of 91%) is obtained of a compound of the formula

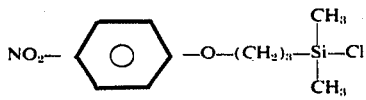

Its boiling point is 178°C/0.2mm Hg and its structure is confirmed by NMR spectroscopy.

EXAMPLE 2

Example 1 is repeated, but with the dimethylchlorosilane replaced by 125 g of methyldichlorosilane.

This gives 260 g of a compound with a boiling point of 177°–178°C / 0.5 mm Hg. I.R. and NMR spectroscopy confirm its structure as

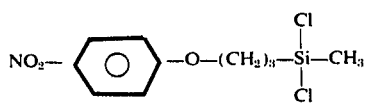

EXAMPLE 3

The same procedure as in Example 1 is followed, but with 150 g of trichlorosilane instead of the dimethylchlorosilane.

This gives 280 g of a compound of the formula

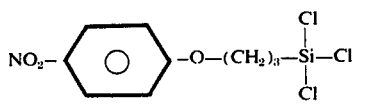

It has a boiling point of 165°–167°C / 0.1 mm Hg and its structure is confirmed by I.R. and NMR spectroscopy.

EXAMPLE 4

As in Example 1, there was heated to 90°C 18 g of allyl ether of para-nitrophenol and 5 ppm of chloroplatinic acid, then added dropwise 17 g of methylphenylchlorosilane.

After 2 hours at 110°C, 28 g (a yield of 85%) of a yellowish oil was obtained. I.R. and NMR spectroscopy confirmed its structure as being

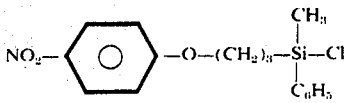

EXAMPLE 5

30 g of allyl ether of paranitrophenol and 5 ppm of chloroplatinic acid are placed in a flask equipped with an agitator. The reaction mixture is brought to 80°C, and then 30 g of triethoxysilane is added dropwise. The reaction is exothermic. After the triethoxysilane has been introduced, the temperature is maintained at 110°C for 2 hours, and the product of the reaction is subsequently distilled. There is obtained 47 g (a yield of 81%) of a compound of the formula

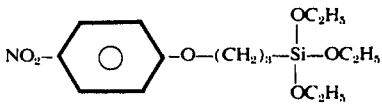

Its boiling point is 155°C/0.02 mm Hg and its structure is confirmed by NMR spectroscopy.

EXAMPLES 6, 7 and 8

Examples 1, 2 and 3 are repeated with the allyl ether of para-nitrophenol replaced by allyl ether of ortho-nitrophenol. The results obtained are set out in Table I below.

TABLE I

| Examples | Products obtained | Boiling point °C/mm Hg | Yield % |
|---|---|---|---|
| 6 | NO$_2$–C$_6$H$_4$–O–(CH$_2$)$_3$–Si(CH$_3$)$_2$–Cl | 142–145/0.2 | 85 |
| 7 | NO$_2$–C$_6$H$_4$–O–(CH$_2$)$_3$–Si(CH$_3$)(Cl)$_2$ | 156/0.3 | 87 |
| 8 | NO$_2$–C$_6$H$_4$–O–(CH$_2$)$_3$–SiCl$_3$ | 158/0.4 | 90 |

EXAMPLES 9 to 14

The chlorosilanes of Examples 1, 2, 3, 6, 7 and 8 are dissolved in proportions of one mole in 500 cm³ of benzene. The solutions are cooled in ice and stoichiometric quantities plus 10% of methanol dissolved in pyridine in a quantity corresponding to the atoms of chlorine are added dropwise. When this has been done, the medium is heated to the boiling point for 2 hours.

The pyridine hydrochloride formed is filtered under vacuum and the benzene is distilled. The formulae (confirmed by I.R. and NMR spectroscopy), boiling points and yield of the products obtained are indicated in Table II.

EXAMPLE 15

Example 9 is repeated with the methanol replaced by ethyl-2-butanol. A 75% yield is obtained of a compound with a boiling point of 180°C/0.5 mm Hg. I.R. and NMR spectroscopy confirm its structure as being

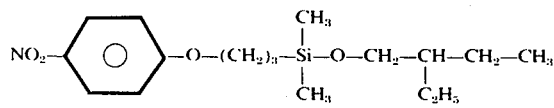

EXAMPLE 16

The compounds of Examples 1, 9, 6 and 12, dissolved in ether and then hydrolyzed with ice water, yield dimers of the structure

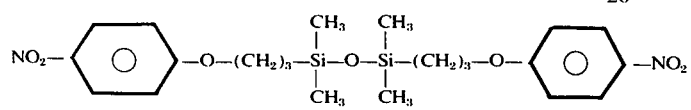

for compounds 1 and 9, and of the structure

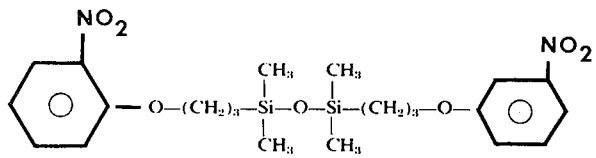

for compounds 6 and 12. The foregoing products are oily compounds having a specific gravity in excess of 1.

EXAMPLE 17

When hydrolyzed, the compounds of Examples 2, 10, 7 and 13 give a polymer made up of a chain of monomeric units of the formula:

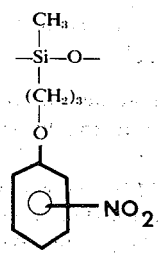

EXAMPLE 18

When the compounds of Examples 3, 11, 8 and 14 are hydrolyzed, they give a cross-linked polymer which is made up of monomeric units of the formula

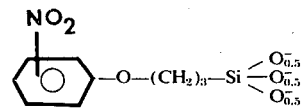

It will be understood that various changes and modifications can be made in the details of formulation, procedure and use without departing from the spirit of the invention, especially as defined in the following claims.

TABLE II

| Examples | Compounds obtained | Boiling Point °C/mm Hg and/or melting point | Yield % |
| --- | --- | --- | --- |
| 9 | NO₂—⟨phenyl⟩—O—(CH₂)₃—Si(CH₃)(OCH₃)—CH₃ | 156–158/0.5 | 90 |
| 10 | NO₂—⟨phenyl⟩—O—(CH₂)₃—Si(OCH₃)₂—CH₃ | 172–176/0.1 | 91 |
| 11 | NO₂—⟨phenyl⟩—O—(CH₂)₃—Si(OCH₃)₃ | Bp — 178/0.1 Mp — 25–30°C | 93 |
| 12 | (2-NO₂)⟨phenyl⟩—O—(CH₂)₃—Si(CH₃)(OCH₃)—CH₃ | 155/0.4 | 85 |
| 13 | (2-NO₂)⟨phenyl⟩—O—(CH₂)₃—Si(OCH₃)₂—CH₃ | 150/0.25 | 85 |
| 14 | (2-NO₂)⟨phenyl⟩—O—(CH₂)₃—Si(OCH₃)₃ | 151–153/0.1 | 89 |

I claim:
1. Silicon compounds having the formula

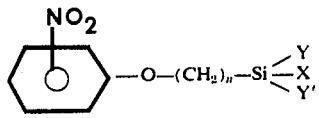

wherein $n$ is a whole number from 2 to 4, X represents a chlorine atom or a straight or branched alkoxy group with 1 to 8 carbon atoms, and Y and Y', which may be similar or different from one another, are each selected from the group consisting of a chlorine atom, a methyl group, an ethyl group, a phenyl group and a straight or branched alkoxy group with 1 to 8 carbon atoms.

2. Polymers and copolymers of the silicon compounds derived from nitrophenols according to claim 1, prepared by hydrolyzing the said compounds, alone or with a functional silane selected from the group consisting of a difunctional silane and a monofunctional silane.

3. Silicon compounds as defined in claim 1 wherein $n$ is 3.

4. Homopolymers of silicon compounds derived from nitrophenols prepared by hydrolyzing compounds as defined in claim 1.

* * * * *